May 30, 1950 G. F. WEATON ET AL 2,509,326
PROCESS FOR THE ELECTROTHERMIC REDUCTION OF ZINC
Filed Jan. 15, 1945 4 Sheets-Sheet 4
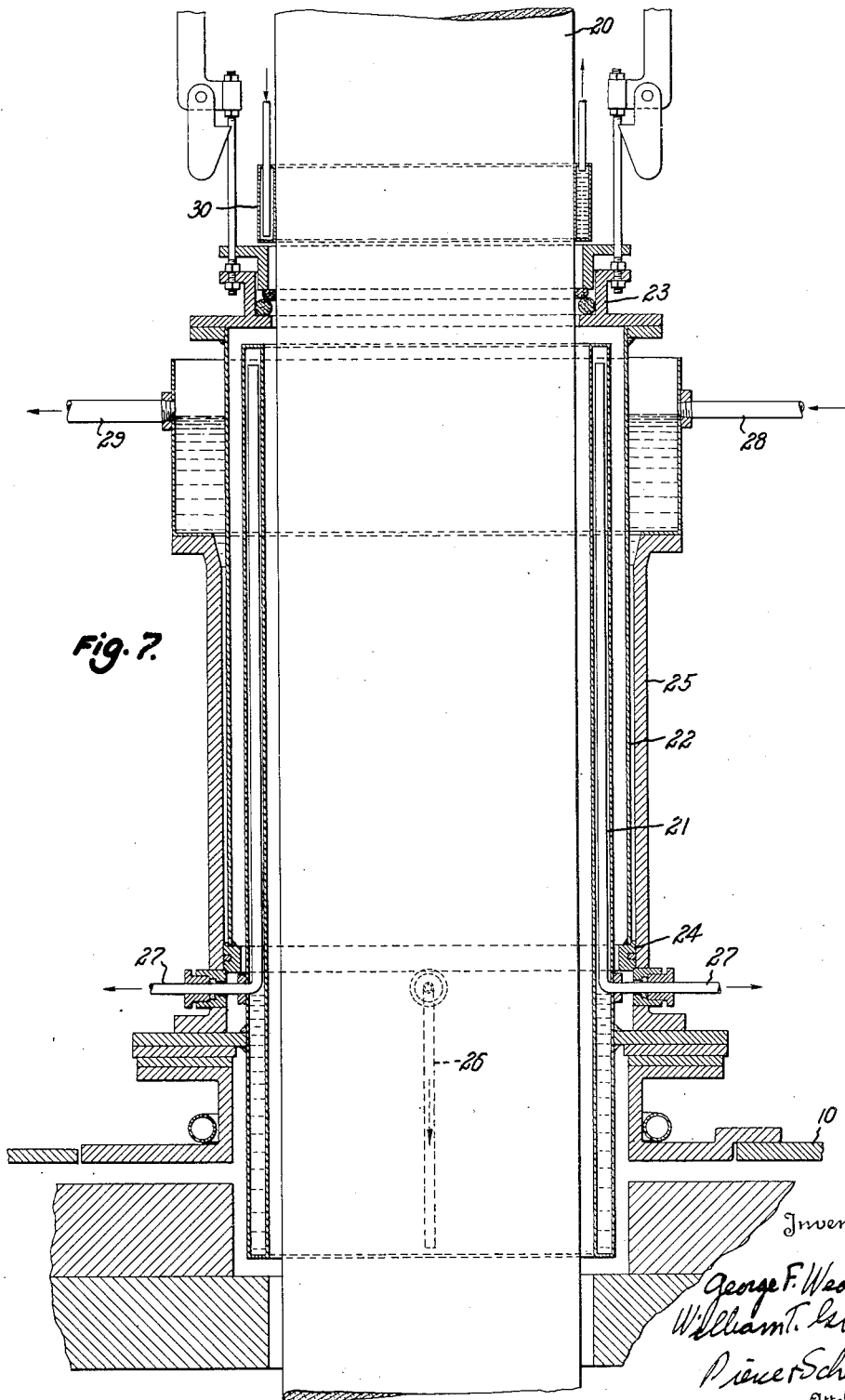

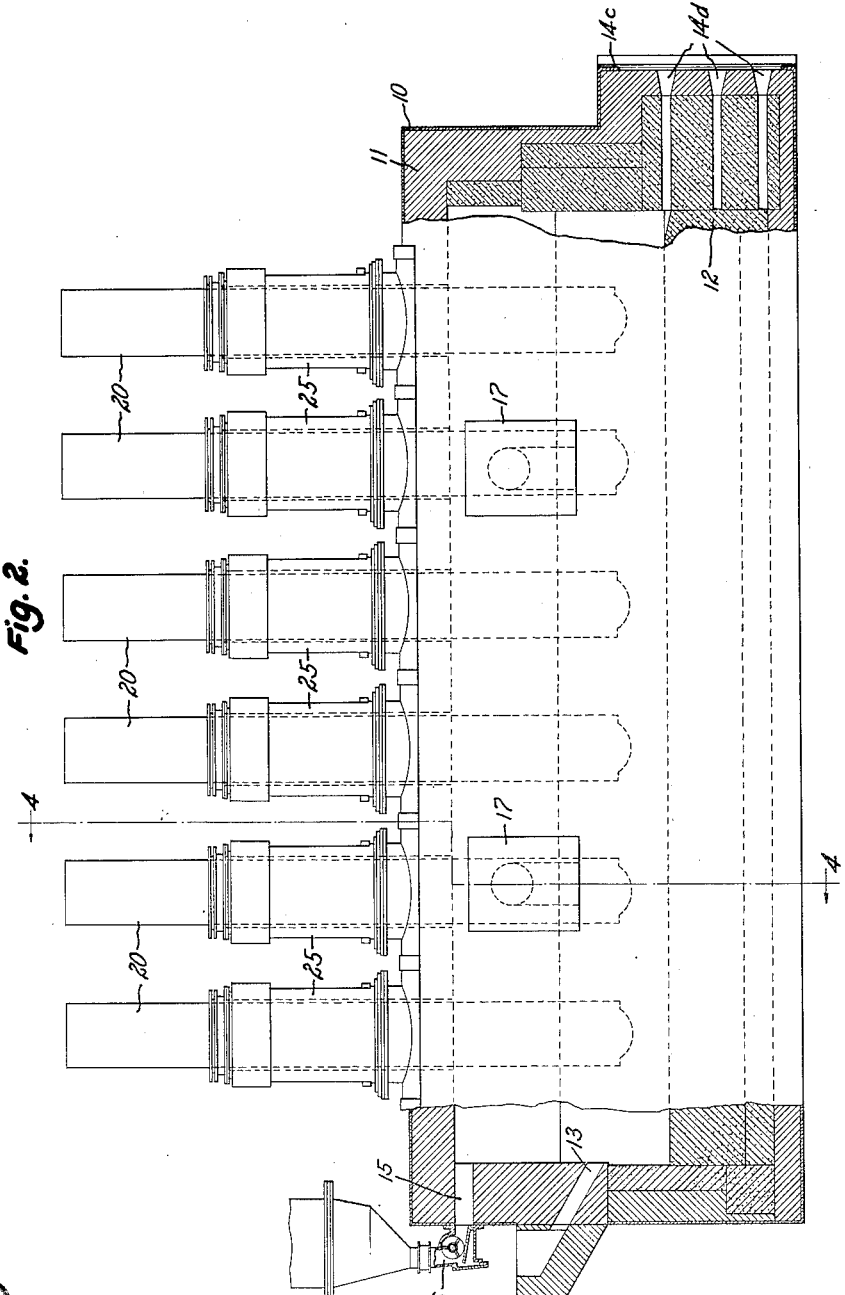

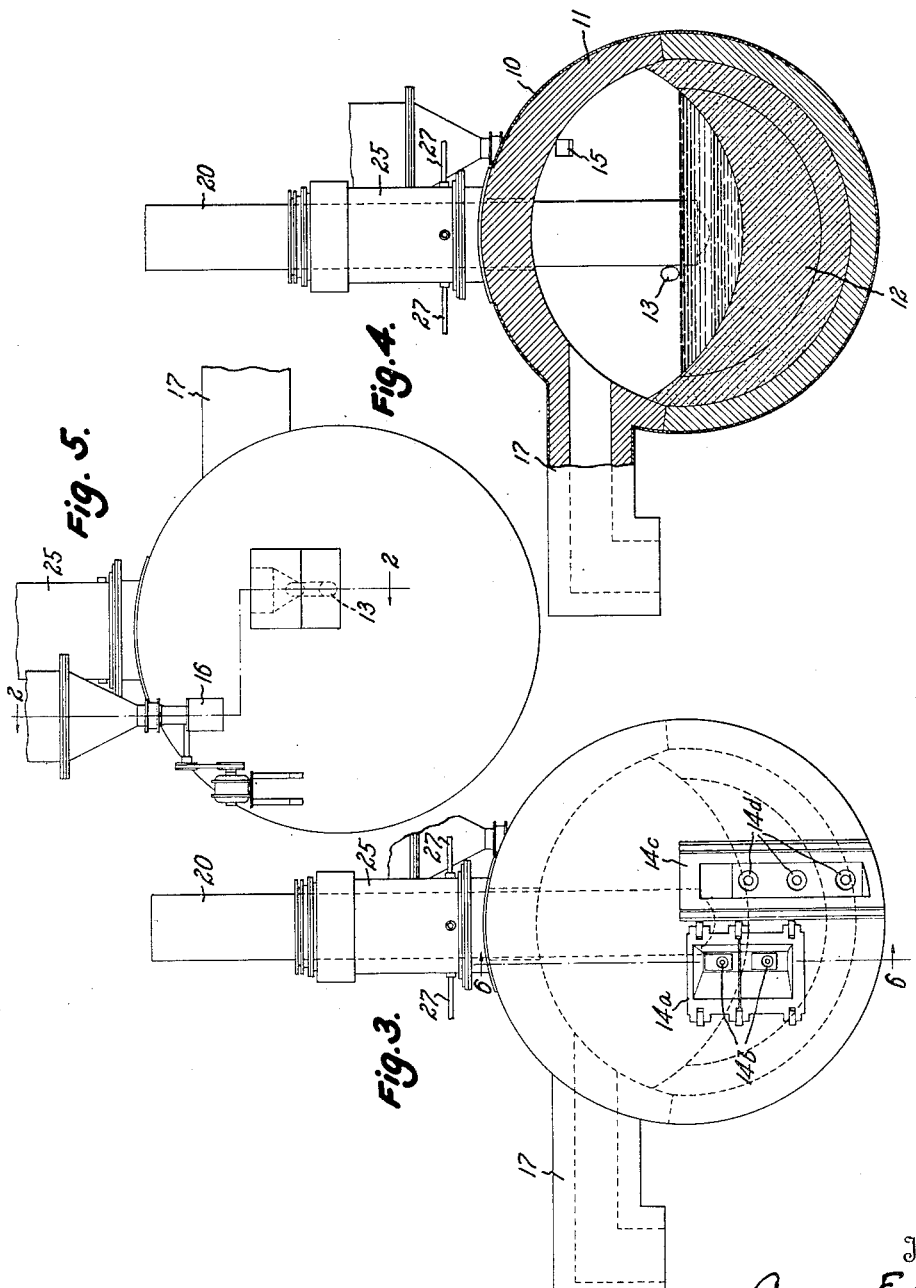

Patented May 30, 1950

2,509,326

UNITED STATES PATENT OFFICE 2,509,326

PROCESS FOR THE ELECTROTHERMIC REDUCTION OF ZINC

George F. Weaton, Potter Township, Beaver County, Pa., and William T. Isbell, Herculaneum, Mo., assignors to St. Joseph Lead Company, New York, N. Y., a corporation of New York Application January 15, 1945, Serial No. 572,950

5 Claims. (Cl. 75—14)

This invention relates to a method and apparatus for the recovery of metallic zinc and other metal values from zinciferous material.

The method and apparatus of the invention are particularly adapted to the direct production of zinc in metallic form from zinciferous materials containing relatively small amounts of zinc, particularly when associated with other metal values, such as lead, copper and iron. Typical of the materials which can be effectively and economically treated are zinciferous lead blast furnace slags and the invention will be more particularly described in its application to the treatment of such slags but the principles of the invention are also useful in the treatment of other zinciferous materials.

Heretofore the recovery of zinc from lead blast furnace slags has involved, first, the fuming off and collecting of an impure zinc oxide, and second, the reduction of the zinc oxide to metal either by electrolytic or pyrolytic means. Although proposals have been made in the past for the recovery of metallic zinc from zinciferous materials by electric smelting of the materials or in the presence of a molten slag bath, none of the proposals have been successfully operated. The principles of the present invention have, however, been successfully applied in full-scale test operations.

The invention involves the recovery of metallic zinc and other values from zinciferous materials by maintaining a body of liquid slag in molten condition by the passage of electric current therethrough or through a layer of coke or other carbonaceous material on the surface thereof, feeding zinciferous material in solid or molten condition into the body of liquid slag, distributing granular carbonaceous reducing agent over substantially the entire surface of the body of liquid slag, withdrawing a gaseous mixture including zinc vapor from above the surface of the body of liquid slag, and withdrawing liquid slag from the body of liquid slag at a zone remote from the zone at which the zinciferous material is fed to the body of liquid slag.

The zinc is condensed from the gaseous mixture by passing the mixture into intimate direct contact with liquid zinc. When treating materials containing lead, a substantial portion of the lead in the form of vapor passes out with gaseous mixture withdrawn from the slag body and is condensed to metallic lead together with zinc in the condenser.

The invention will be described with reference to the accompanying drawings illustrating a plant and apparatus for the recovery of zinc from lead blast furnace slag and other zinciferous materials in accordance with the principles of the invention.

In the drawings:

Fig. 2 is a side elevation in partial section of the electric furnace of the invention;

Fig. 3 is a view of the tapping end of the electric furnace of Fig. 2;

Fig. 4 is a transverse section on line 4—4 of Fig. 2;

Fig. 5 is a view of the feed end of the electric furnace of Fig. 2;

Fig. 6 is a fragmentary sectional elevation of the tapping end of the furnace on line 6—6 of Fig. 3, and Fig. 7 is an enlarged fragmentary detail view in partial section of an electrode of the furnace with associated sealing and cooling devices.

Figure 1:
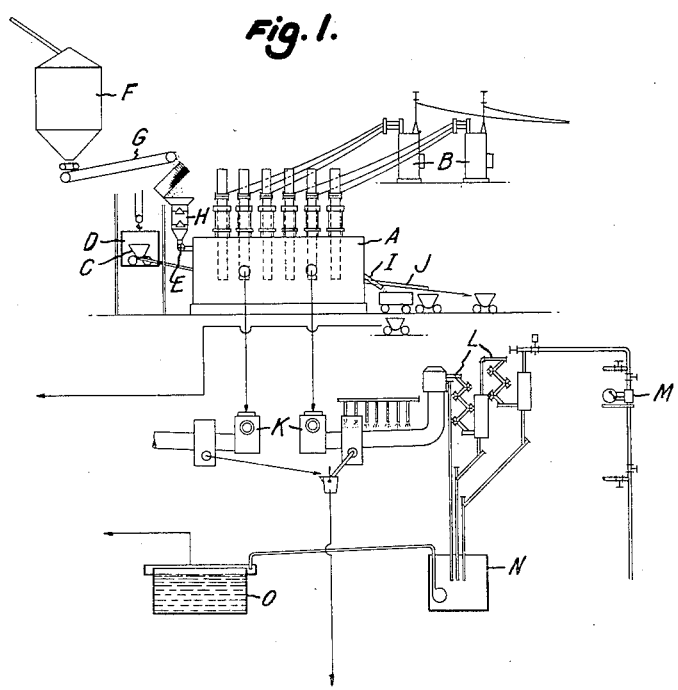
Fig. 1 is a diagrammatic layout of a plant embodying the principles of the invention.

In the plant layout diagrammatically shown in Fig. 1, A is an electric furnace having six electrodes supplied with three-phase current from transformers B, C is a slag buggy raised by elevator D to pour into the feed hole of the furnace, E is a coke feeder supplied from storage bin F by elevator G and feed gates H, I and J are slag and matte tap spouts, respectively, K are zinc condensers of the internal type described in United States Patent 2,070,101 to Weaton and Najarian, L are gas washers of the type described in United States Patent 2,298,139 to Long and Deeley, M is a gas pump, N is a liquid receiving tank, and O is a settling tank.

The electric furnace shown more particularly in Figs. 2 to 6 comprises a horizontal cylindrical shell 10, which may have a refractory lining of firebrick 11 and a furnace bottom of carbon blocks 12. The exterior of the furnace may be cooled by means of water sprays, water jackets and the like. Such cooling is particularly advantageous in the zone of the slag level and immediately above and below this level. Slag is fed through a hole 13 above the maximum slag level in one end of the furnace and spent slag is withdrawn through a water-cooled tap block 14a, in the opposite end of the furnace. Tap block 14a preferably includes a number of holes 14b at different levels to provide for lowering the slag level as the furnace bottom becomes lower by erosion and oxidation during operation. A tap block 14c including tap holes 14d permits the withdrawal of matte and iron at different furnace bottom levels. Coke is fed into the furnace, advantageously at the slag feed end, through coke hole 15 by means of a motor-driven flinger mechanism 16 which distributes coke substantially uniformly over the slag bath in the furnace. Solid zinciferous materials may also be fed to the furnace in a similar manner although the distribution of such materials is preferably limited to a zone adjacent the slag feed end of the furnace.

Three-phase electric current is supplied to the furnace through six carbon electrodes 20, shown in more detail in Fig. 7.

Lateral vapor outlets 17 each lead to an internal condenser as shown diagrammatically in Fig. 1.

The electrodes 20 are independently adjustable vertically by means of supporting and elevating mechanism, not shown. The electrodes are cooled adjacent the furnace by water-filled annular jackets 21. They are sealed by means of depending cylindrical skirts 22, the upper ends of which are clamped around the electrode by means of sealing glands 23 and the lower ends of which carry sealing glands 24 in tight sliding contact with the inner surface of cylindrical shell 25 forming a water reservoir. Cooling water is supplied to the bottom of the cooling jacket 21 by inlet pipe 26 and flows out through outlet pipe 27. A constant head of water is maintained in reservoir 25 by supply pipe 28 and outlet pipe 29. An auxiliary cooling ring 30 at the point where the electrode is first exposed to the air is advantageous in eliminating necking of the electrode due to superficial oxidation.

In operation, slag is fed continuously or semi-continuously into the furnace, maintaining a molten bath of slag preferably 10 to 20 inches deep by supplying the necessary power input, withdrawing spent slag preferably semi-continuously, and periodically tapping off liquid zinc from the condensers.

In a typical operation, molten slag at about 1100°–1150° C. is delivered from the lead blast furnaces in ladle cars which are elevated for proper position to pour the slag into the furnace through a cast iron launder and feed hole 13.

A substantially constant feed of granulated coke, preferably sized to the range ⅜ to ¾ inch, is maintained through the coke feeder 16, at a rate at least equivalent to the zinc content of the slag, for example, about 7.5% of the weight of slag fed for a slag of 14% zinc content.

Power input is regulated in accordance with the amount of slag being fed, about 600–650 kilowatt hours per ton of slag being required for a 12% zinc slag and somewhat more power for richer slags. The individual electrode positions are adjusted so that, approximately, the current and voltage to ground readings are the same for all six electrode circuits.

Condenser vacuum is adjusted so that the furnace is under slight positive pressure (about one inch of water). A characteristic of Weaton-Najarian condensers is the "breathing" action induced by the to and fro movement of the molten metal. Thus, while the average pressure inside the furnace may be 1–2 inches of water, instantaneous pressure values of plus or minus 5 inches of water are frequently observed.

As zinc is condensed and accumulates in the condenser more vacuum is required to "pull" the gas through the condenser. Thus, the vacuum gage reading (at a given gas flow rate) is an indication of the amount of metal in the condenser and serves as a guide to time to tap the condenser. Condensers are usually tapped when the vacuum reaches 14–15″ Hg., the vacuum falling about an inch more or less with the removal of 1500 pounds of metal. Metal tapped from the condensers is transferred to a holding furnace where excess lead settles out and from which the zinc is cast into ingots. Metal is of good prime western grade, containing about 1% Pb.

When treating blast furnace slags and materials containing lead, a substantial recovery of the lead content is obtained. That portion of the recoverable lead which passes to the condenser in the form of lead vapor is directly condensed to metallic lead together with zinc in the condenser. Approximately 50% of the recoverable lead is directly condensed to metallic lead together with zinc in the condenser. This lead is readily separated from the zinc in the subsequent step of settling and parting taking place in the settling furnace. After a simple refining for the removal of zinc this is a high grade commercial soft lead. A portion of lead in the charge is evolved from the furnace as lead sulphide vapors and passes on through the condenser with the non-condensable gases. The lead sulphide is washed out of the gas stream in the washer and gas-cleaning apparatus and passes to settling tank O, Fig. 1. These solids may be retreated in the blast furnace or by other suitable means for the recovery of the remaining recoverable portion.

Slag tapping keeps pace with slag feeding. Slag depth is measured by a bar let down through a hole in the furnace roof. Slag fall is approximately 80% of the weight of incoming slag when the latter contains 12–13% Zn.

The exit slag normally has a temperature as determined by optical pyrometer measurements of about 1350°–1400° C.

Matte and iron tend to settle toward the bottom of the furnace and may be periodically tapped from a taphole at a suitable level.

The following analyses of the blast furnace slag and stripped slag are typical:

|  | Pb | Cu | Insol. (SiO₂) | SiO₂ | FeO | CaO | MgO | S | Zn | Al₂O₃ | Ag |
|---|---|---|---|---|---|---|---|---|---|---|---|
|  | Per cent | Per cent | Per cent | Per cent | Per cent | Per cent | Per cent | Per cent | Per cent | Per cent | Per cent |
| Blast furnace slag | 2.65 | .56 |  | 26.0 | 35.4 | 8.1 | 4.1 | 2.6 | 12.9 | 3.8 | Tr. |
| Stripped slag | .10 | .11 | 32.3 |  | 35.3 | 10.8 | 6.5 | 1.5 | 2.8 | 9.0 |  |

The stripped slag and mattes obtained vary widely in composition depending on the values in the charged materials. A typical analysis of matte is as follows:

|  | Pb | Cu | Insol. | Fe | S | Zn | Ni-Co |
|---|---|---|---|---|---|---|---|
| Matte-iron composite | Per cent 1.6 | Per cent 7.8 | Per cent 0.2 | Per cent 58.1 | Per cent 27.4 | Per cent Tr. | Per cent 1.9 |

In general, by the method and apparatus of the invention, it is possible to recover at least 75% of the zinc in the slag fed to the furnace in the form of slab zinc and 90% of the lead together with values in precious metals which will appear in the matte depending upon the content of these metals in the materials charged to the furnace, with a power consumption of 800 kilowatt hours per ton of slag of 14% zinc content and a coke consumption of not over 7.5% of the slag weight. When zinciferous materials are fed to the slag bath in solid form, a somewhat higher power consumption is to be expected.

The term "slag" when used in this specification and in the claims without further qualification is not intended to be restricted to residual or waste products from previous metallurgical operations, but includes refractory mineral compositions liquid at the temperature of operation regardless of their derivation. For example, the "slag" body may be provided by fluxing low-grade zinc silicate ores in a cupola type furnace and charging the molten magma thus obtained into the stripping furnace.

It is desirable that the major portion of the coke feed be of substantially uniform size to facilitate uniformity of distribution of the coke over the surface of the slag in the furnace and to avoid mechanical difficulties in the coke distributor.

The operation of the method and apparatus of the invention is highly flexible and may readily be adjusted to a wide range of variation in the character and composition of the zinciferous materials supplied thereto as well as to variations in the rate of supply, the principal control factors being the power supply and the rate of coke feed.

We claim:

1. A method of recovering zinc from zinciferous materials which comprises maintaining a body of zinciferous material in molten condition by the passage of electric current therethrough, feeding zinciferous material substantially free from reducing agent into said body of molten zinciferous material, maintaining a layer of granular carbonaceous reducing agent over the entire surface of said body of molten zinciferous material, supplying granular carbonaceous reducing agent to said layer in an amount at least equivalent to the zinc content of the zinciferous material fed to said body of molten zinciferous material, withdrawing a gaseous mixture including zinc vapor from above the layer of granular reducing agent, and withdrawing liquid slag from said body at a zone remote from the zone at which the zinciferous material is fed to the body.

2. A method of recovering zinc from zinciferous materials which comprises maintaining a body of liquid zinciferous slag in molten condition by the passage of electric current therethrough, feeding molten zinciferous slag substantially free from reducing agent into said body of molten zinciferous slag, maintaining a layer of granular carbonaceous reducing agent over the entire surface of the body of molten slag, supplying granular carbonaceous reducing agent to said layer in an amount at least equivalent to the zinc content of the zinciferous material fed to said body of molten slag, withdrawing a gaseous mixture including zinc vapor from above the layer of granular reducing agent, and withdrawing liquid slag from said body at a zone remote from the zone at which the zinciferous material is fed to the body.

3. A method as defined in claim 1 in which the reducing agent is granular coke, the major portion of the particles of the coke being in the size range of ⅜ inch to ¾ inch.

4. A method of recovering zinc and lead from metalliferous materials containing zinc and lead which comprises maintaining a body of metalliferous material in molten condition by the passage of electric current therethrough, feeding the metalliferous material substantially free from reducing agent into said body of molten material, maintaining a layer of granular carbonaceous reducing agent over the entire surface of the body of molten material, supplying granular carbonaceous reducing agent to said layer in an amount at least equivalent to the zinc content of the metalliferous material fed to said body of molten material, withdrawing a gaseous mixture including zinc and lead vapor from above the layer of granular reducing agent, and withdrawing liquid slag from said body at a zone remote from the zone at which the metalliferous material is fed to said zone.

5. A method of recovering metal values from metalliferous materials containing zinc, lead and copper, which comprises maintaining a body of metalliferous material in molten condition by the passage of electric current therethrough, feeding the metalliferous material substantially free from reducing agent into said body of molten material, maintaining a layer of granular reducing agent over the entire surface of the body of molten material, supplying granular carbonaceous reducing agent to said layer in an amount at least equivalent to the zinc content of the metalliferous material fed to said body of molten material, withdrawing a gaseous mixture including zinc and lead vapor from above the layer of granular reducing agent, and withdrawing liquid slag and copper-bearing matter from said body at a zone remote from the zone at which the metalliferous material is fed to said body.

GEORGE F. WEATON.
WILLIAM T. ISBELL.

REFERENCES CITED

The following references are of record in the file of this patent:

UNITED STATES PATENTS

| Number | Name | Date |
|---|---|---|
| 815,293 | Heroult | Mar. 13, 1906 |
| 1,219,194 | Thomson et al. | Mar. 13, 1917 |
| 1,308,879 | Thomson | July 8, 1919 |
| 1,321,683 | Thomson | Nov. 11, 1919 |
| 1,342,636 | Louvrier | June 8, 1920 |
| 1,422,135 | Rogatz | July 11, 1922 |
| 1,430,971 | Fornander | Oct. 3, 1922 |
| 1,461,103 | Dryssen | Sept. 18, 1923 |
| 1,732,431 | Bruggman | Oct. 22, 1929 |
| 1,738,910 | Lepsoe | Dec. 10, 1929 |
| 1,822,396 | Fowler et al. | Sept. 8, 1931 |
| 1,981,028 | Bunce et al. | Nov. 20, 1934 |
| 2,070,101 | Weaton et al. | Feb. 9, 1937 |
| 2,243,096 | Hardin | May 27, 1941 |